US007129508B2

(12) United States Patent
Chen

(10) Patent No.: US 7,129,508 B2
(45) Date of Patent: Oct. 31, 2006

(54) COMPACT VCSEL SENSOR WITH MULTIPLE SENSING CAPABILITIES

(75) Inventor: Bo Su Chen, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 354 days.

(21) Appl. No.: 10/291,966

(22) Filed: Nov. 11, 2002

(65) Prior Publication Data

US 2003/0138020 A1  Jul. 24, 2003

Related U.S. Application Data

(60) Provisional application No. 60/349,902, filed on Jan. 18, 2002.

(51) Int. Cl.
 *G01N 21/86* (2006.01)
 *G01V 8/00* (2006.01)
 *G02B 27/10* (2006.01)

(52) U.S. Cl. .............................. 250/559.4; 250/559.15; 250/216; 250/559.36; 250/559.32; 356/28; 359/619; 359/623; 359/626

(58) Field of Classification Search ................ 250/216, 250/559.22, 231.13–14, 559.36, 559.13, 250/559.15, 559.39, 559.4; 356/600, 27, 356/28, 495; 359/618, 619, 621–623, 626, 359/641, 708; 369/112.01, 44.23, 13.28, 369/112.23–112.26, 44.37

See application file for complete search history.

(56) References Cited

U.S. PATENT DOCUMENTS 5,114,226 A * 5/1992 Goodwin et al. .......... 356/4.09

(Continued)

FOREIGN PATENT DOCUMENTS

DE 4240735 A 6/1994

(Continued)

OTHER PUBLICATIONS

International Search Report, dated Jan. 21, 2003, relative to PCT application No. PCT/US 03/01656, the foreign equivalent to the instant U.S. Appl. No. 10/291,966.

(Continued)

*Primary Examiner*—Thanh X. Luu
*Assistant Examiner*—Stephen Yam
(74) *Attorney, Agent, or Firm*—Brian N. Tufte

(57) ABSTRACT

The invention includes also a sensor tat includes at least one laser, at least one detector, and at least one lens system that includes a sensor surface having three individual surfaces that are virtually the same, and an object surface having two individual surfaces that are virtually the same. The invention also includes a sensor having at least one source that produces radiation, at least one detector; and a lens system that collimates and focuses the radiation onto at least two different regions of a surface of a reflective object, wherein the reflective object reflects the incident radiation, and the lens system collimates and focuses the reflected radiation onto the detector, thereby sensing the reflective object.

42 Claims, 6 Drawing Sheets

U.S. PATENT DOCUMENTS

| | | | |
|---|---|---|---|
| 5,127,733 | A | 7/1992 | Allgauer |
| 5,293,269 | A | 3/1994 | Burkhart et al. |
| 5,504,345 | A | 4/1996 | Bartunek et al. |
| 5,513,201 | A | 4/1996 | Yamaguchi et al. |
| 5,615,198 | A * | 3/1997 | Kubokawa ............... 369/102 |
| 5,644,413 | A | 7/1997 | Komma et al. |
| 5,784,163 | A * | 7/1998 | Lu et al. .................... 356/495 |
| 5,805,748 | A | 9/1998 | Izawa |
| 5,808,986 | A * | 9/1998 | Jewell et al. ............ 369/44.37 |
| 5,812,249 | A * | 9/1998 | Johnson et al. ............... 356/28 |
| 5,835,224 | A * | 11/1998 | Hercher .................... 356/620 |
| 5,859,439 | A * | 1/1999 | Nam et al. .................. 250/548 |
| 5,877,856 | A * | 3/1999 | Fercher ..................... 356/492 |
| 5,912,872 | A * | 6/1999 | Feldman et al. ......... 369/13.32 |
| 6,014,360 | A | 1/2000 | Yonekubo et al. |
| 6,130,437 | A | 10/2000 | Cerny et al. |
| 6,323,949 | B1 | 11/2001 | Lading et al. |
| 6,707,053 | B1 * | 3/2004 | Togashi ................ 250/559.37 |
| 6,737,665 | B1 * | 5/2004 | Kinrot et al. .......... 250/559.36 |

FOREIGN PATENT DOCUMENTS

| | | | |
|---|---|---|---|
| JP | 10239449 A | 9/1998 | |
| WO | WO 0114231 A | 3/2001 | |

OTHER PUBLICATIONS

Hama ROX Wafer Mapping Sensor, data sheet, CyperOptics Semiconductor Group, 2001.

Laser Proximity Sensors DRM Series—50/51, 100/101, 150/151, data sheet, HAMA Laboratories, Oct. 11, 1999.

Laser Proximity Sensors DRM Series—DX-40, DX-41, data sheet, HAMA Laboratories, Oct. 11, 1999.

Laser Proximity Sensors WX Series—WX-40, WX-42, WX-43, data sheet, HAMA Laboratories, Oct. 11, 1999.

Commercial Grade High Pressure Sensors 20 PC Family, data sheet, Honeywell International Inc., Sep. 2000.

PD45 Series PicoDot, data sheet P/N 115700, Banner Engineering Corp., pp. 1-7, Oct. 2003.

Sensing Theory Primer, Banner Engineering Corp., pp. 1-29, 1998.

* cited by examiner

COMPACT VCSEL SENSOR WITH MULTIPLE SENSING CAPABILITIES

This application claims priority to U.S. Provisional Application Serial No. 60/349,902, filed on Jan. 18, 2002, entitled COMPACT VCSEL SENSOR WITH MULTIPLE SENSING CAPABILITIES, the disclosure of which is incorporated by reference herein in its entirety.

FIELD OF THE INVENTION

The invention relates generally to a vertical cavity surface emitting laser sensor. More specifically, the invention relates to a vertical cavity surface emitting laser sensor that includes a laser, a detector, and a lens system.

BACKGROUND OF THE INVENTION

Semiconductor lasers emit radiation with spatial and temporal coherence. Radiation from semiconductor lasers is highly monochromatic and produces highly directional beams of light. Semiconductor lasers are generally very compact in size, and are efficient. Radiation is formed in a semiconductor laser within the active region of the laser and emitted vertically with respect to the laser surface.

Vertical cavity surface emitting lasers (VCSELs) are a type of semiconductor lasers that have a very low threshold current, a high beam quality, and high speed operation. VCSELs are formed by placing the active region between two highly reflective mirrors, called Bragg mirrors, formed from alternating layers of semiconductor materials with high and low indices of refraction. The configuration of the active region and the Bragg mirrors allows for a standing wave to be formed between the lower and upper mirrors, which increase the efficiency of the VCSEL.

Semiconductor lasers, especially VCSELs are used in numerous applications where efficient sources of radiation are desired. VCSELs are often configured with different types of photodetectors and optical systems for use in various applications, such as for example, object detection, velocity measurement, and length measurement.

Systems for accomplishing such tasks as object detection, velocity measurement, and length measurement can often require very expensive components, including optical systems, and multiple lasers. Such systems are also often quite large, and generally require the system to be configured very specifically with the object to be detected in order to maintain alignment for proper detection. Examples of some such devices include those disclosed in U.S. Pat. No. 5,513,201, Yamaguchi et al., discloses a device that includes a linear array laser diode and an optical path rotating device designed to convert the dotted line output of the linear array laser diode into an output that has a structure similar to ladder rungs for rotating the optical path of a laser. Further, U.S. Pat. No. 5,644,413, Komma et al., discloses a device that includes a semiconductor laser, an elaborate lens system, and a photodetector designed to shift the relative position of the information medium and the optical head in a magnetic read/write system.

U.S. Pat. No. 5,805,748, Izawa, discloses a system that includes a laser beam divided into a number of beam sections along the horizontal direction, and a beam converging guide that focuses the laser beam into a more circular cross section. U.S. Pat. No. 6,014,360 discloses a system that includes a laser beam, and an optical intensity converting means, which is generally an objective lens, that functions to condense the laser beam to create a smaller beam for use in optical recording heads.

U.S. Pat. No. 5,504,345, Bartunek et al., discloses a system for detecting the edge of an object that includes two light sources positioned so that the respective beams are focused at the same point on the object, and two detectors which monitor the reflected light from the object. U.S. Pat. No. 6,130,437, Cerney et al., discloses an improvement to the above edge detection system that includes a transmitter, associated optical elements, and a receiver for detecting the edge of an object. This system provides a wider angle of detection than Bartunek does.

Although systems such as these can accomplish the required tasks, they can be expensive and often must be exactingly aligned. As a result, there remains a need for low cost, compact, reliable systems that are capable of accomplishing tasks such as object detection, velocity measurement, and length measurement.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with the invention, there is provided a sensor having at least one source that produces radiation, at least one detector; and a lens system that collimates and focuses the radiation onto at least two different regions of a surface of a reflective object, wherein the reflective object reflects the incident radiation, and the lens system collimates and focuses the reflected radiation onto the detector, thereby sensing the reflective object.

In accordance with another aspect of the invention, there is provided a sensor that includes at least one laser, at least one detector, and at least one lens system that includes a sensor surface having three individual surfaces that are virtually the same, and an object surface having two individual surfaces that are virtually the same.

In accordance with another aspect of the invention there is provided a method of sensing a reflective object that includes the steps of emitting radiation from at least one source, collimating and focusing the radiation onto at least two regions of a reflective object to be sensed, collimating and focusing the reflected radiation onto at least one detector, and detecting the focused radiation.

In accordance with another aspect of the invention there is provided a method of determining the velocity of an object that includes the steps of sensing at least one edge of an object with a sensor that includes at least one source of radiation, at least one detector, and at least one lens system that collimates and focuses the radiation into at least two different beams that impinge upon the surface of a reflective object, wherein the reflective object reflects the radiation, and the lens system collimates and focuses the reflected radiation onto the detector, thereby sensing the reflective object, calculating the velocity of the object by determining the distance between the two different beams impinging upon the surface of the object, and dividing the distance by the difference in the time it takes the two beams to detect at least one edge of the object to determine the velocity of the object.

Devices of the invention include a lens system. The lens system is configured so that it first collimates the beam from the VCSEL, then equally splits and focuses the beam into two spots on the surface to be monitored. The lens system then images a first spot onto a first detector. The second spot is similarly imaged onto a second detector by the lens system.

Devices of the invention include multifunction VCSEL laser sensors that can be used as reflective encoders, wafer mapping sensors with redundant detection, or a speed sensor measuring speed and length of a flight target. The specific configuration of the lens system depends on the particular application. Devices of the invention are very compact, efficient and accurate.

When used as a reflective encoder (linear or rotary) the phase relation is defined by the spacing of the two focal points on the object.

For wafer mapping the two sensing regions of the sensor offer a significant advantage. Current wafer processing equipment utilizes multiple sensors, whereas a single device of the invention could be used to obtain reliable wafer edge detection.

When used as a speed sensor, the detectors of the sensor are triggered when the leading and trailing edge of a flight target are impinged upon by the source. The velocity of the target can then be determined. Once the velocity has been determined, the length of the target itself can also be determined using a device of the invention.

The novel features of the invention will become apparent to those of skill in the art upon examination of the following detailed description of the invention or can be learned by practice of the invention. It should be understood, however, that the detailed description of the invention and the specific examples presented, while indicating certain embodiments of the invention, are provided for illustration purposes only because various changes and modifications within the scope of the invention will become apparent to those of skill in the art from the detailed description of the invention and claims that follow.

BRIEF DESCRIPTION OF THE FIGURES

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

It should be understood that the drawings are not necessarily to scale and that the embodiments are illustrated using graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

The invention provides a sensor having at least one source that produces radiation, at least one detector; and a lens system that collimates and focuses the radiation onto at least two different regions of a surface of a reflective object, wherein the reflective object reflects the incident radiation, and the lens system collimates and focuses the reflected radiation onto the detector, thereby sensing the reflective object.

Figure 1:
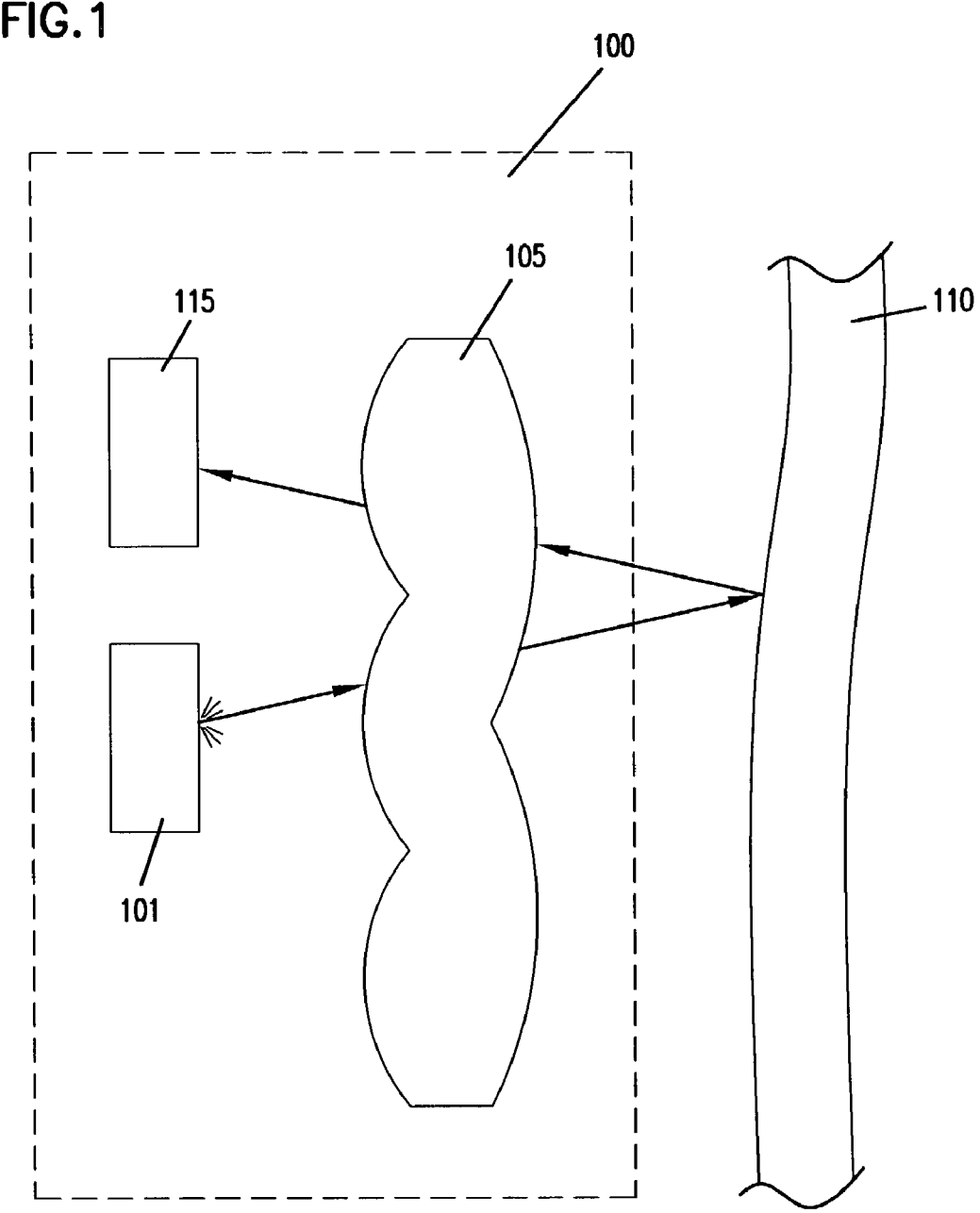
FIG. 1 represents a schematic diagram of a device in accordance with one aspect of the invention.

FIG. 1 depicts a device in accordance with one aspect of the invention. A device of the invention 100 comprises at least one source 101, at least one lens system 105, and at least one detector 115.

Source 101 provides radiation that is ultimately transmitted to the object 115 and reflected back towards detector 115. Source 101 can comprise any device or object that emits radiation capable of detection by detector 115. Source 101 can include, but is not limited to semiconductor lasers such as vertical cavity surface emitting lasers (VCSELs), edge emitting lasers, or light emitting diodes (LEDs). Preferably, source 101 comprises a VCSEL because VCSELs generally have a smaller spot size than other types of sources, which would increase the ultimate resolution and detection of the device 100. More preferably, the VCSEL that is utilized as the source 101 in a device 100 of the invention has a relatively low power consumption, thereby allowing the device 100 to be powered by a battery (not shown). Most preferably, the VCSEL that is utilized in a device of the invention has a threshold current of less than 1 mAmp. In one embodiment of the invention, device 100 comprises more than one individual source 101.

Detector 115 detects radiation emitted by source 101. Detector 115 can comprise any device or object that is capable of detecting radiation produced by source 101. Detector 115 can include but is not limited to photodetectors, p-n junction detectors, and phototransistors. Preferably, detector 115 comprises a photodetector. In one embodiment of the invention, device 100 comprises more than one individual detector 115.

Devices of the invention 100 also comprise lens system 105. Lens system 105 functions to transmit the radiation emitted from source 101, focus the radiation into at least two spots on object 110, and focus reflected radiation from object 110 onto detector 115. Lens system 105 comprises a collimating function and a focusing function.

Collimating lenses function to modify the individual paths of rays of radiation causing them to become more nearly parallel to each other. Focusing lenses function to modify the individual paths of the rays of radiation causing them to converge and be directed to a focal point at some distance beyond the lens.

Figure 2:
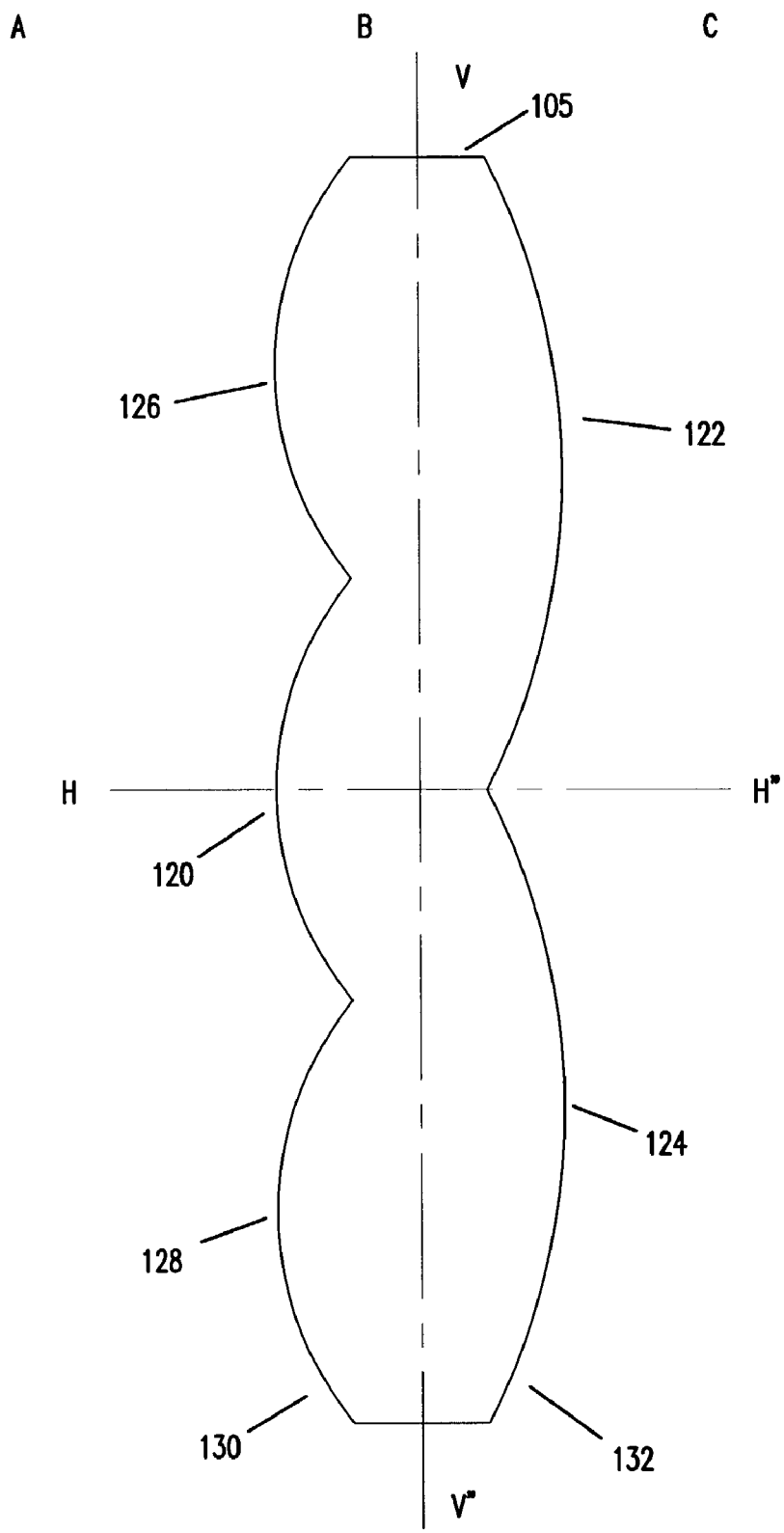
FIG. 2 represents a vertical cross section of a lens system in accordance with one aspect of the invention.

FIG. 2 depicts one embodiment of lens system 105 in accordance with the invention. This embodiment of lens system 105 comprises first lens surface 120, second lens surface 122, third lens surface 124, fourth lens surface 126 and fifth lens surface 128. Lens system 105 is symmetrical across a horizontal axis defined by the axis defined by a line H–H' as shown in FIG. 2. Lens system 105 can be further described by referring to the axis defined by a line V–V' that defines two surfaces, a sensor surface 103 and an object surface 132.

Generally, the sensor surface 130 of lens system 105 is comprised of three individual surfaces, first lens surface 120, fourth lens surface 126 and fifth lens surface 128. First lens surface 120, fourth lens surface 126 and fifth lens surface 128 are virtually the same. As used herein, "virtually the same" means that the lens surfaces were designed to have the same optical properties, but may have differences caused by, produced by, or inherent in the fabrication, or use of the lens system.

Generally, object surface 132 of lens system 105 includes second lens surface 122 and third lens surface 124. Second lens surface 122 and third lens surface 124 are virtually the same. As used herein, "virtually the same" means that the lens surfaces were designed to have the same optical properties, but may have differences caused by, produced by, or inherent in the fabrication, or use of the lens system.

The individual lens surfaces, first lens surface 120, second lens surface 122, third lens surface 124, fourth lens surface 126 and fifth lens surface 128, can have variable functions depending on the direction from which radiation enters lens system 105. The first lens surface 120, fourth lens surface 126 and fifth lens surface 128 function as collimating lenses when radiation travels from A to B. Alternatively first lens surface 120, fourth lens surface 126 and fifth lens surface 128 function as focusing lenses when radiation travels from B to A. Similarly second lens surface 122 and third lens surface 124 function as focusing lenses when radiation travels from B to C. Second lens surface 122 and third lens surface 124 function as collimating lenses when radiation travels from C to B.

Lens system 105 can be formed of a single component or can be formed from multiple components. For example, lens system 105 can comprise a number of different lenses, or one single component that contains all of the individual lens surfaces. Preferably lens system 105 is a single component that comprises all of the individual lens surfaces.

The individual lens surfaces of lens system 105 can be spherical or aspherical. Aspherical lenses are referred to as such because they have a curved surface that does not conform to the shape of a sphere. Aspherical lenses correct defects seen in spherical lenses. In spherical lenses, rays coming from the periphery of the lens form the image before the ideal focal point. Therefore, a spherical aberration (a blurred image) occurs at the center portion of the image formed. With an aspherical lens, the rays coming from the lens periphery meet at the focal point, thus forming a sharp image without such aberrations. Because of the diminished amount of aberration of aspherical lenses, it is preferred that the individual lens surfaces of lens system 105 are aspherical.

Other parameters of the individual lens surfaces of lens system 105 include diameter, and focal point.

The diameters of the individual lens surfaces are dictated at least in part by the size, and location of the detector 115. For example, if the detector 115 has a large capture area, less light is necessary for acceptable detectable levels, therefore the diameter of the individual lens surfaces can be less. However if the detector 115 has a small capture area more light is preferred, which would require individual lens surfaces of larger diameter. Regarding the location of the detector 115, if the device of the invention 100 is configured to be farther from the object 110 it is preferred that the diameter of the individual lens surfaces be large so that more light will ultimately impinge on the detector 115. However, if the detector 115 is in close proximity to the object 110 the diameter of the individual lens surfaces may be smaller and still result in a functional device 100.

Figure 3:
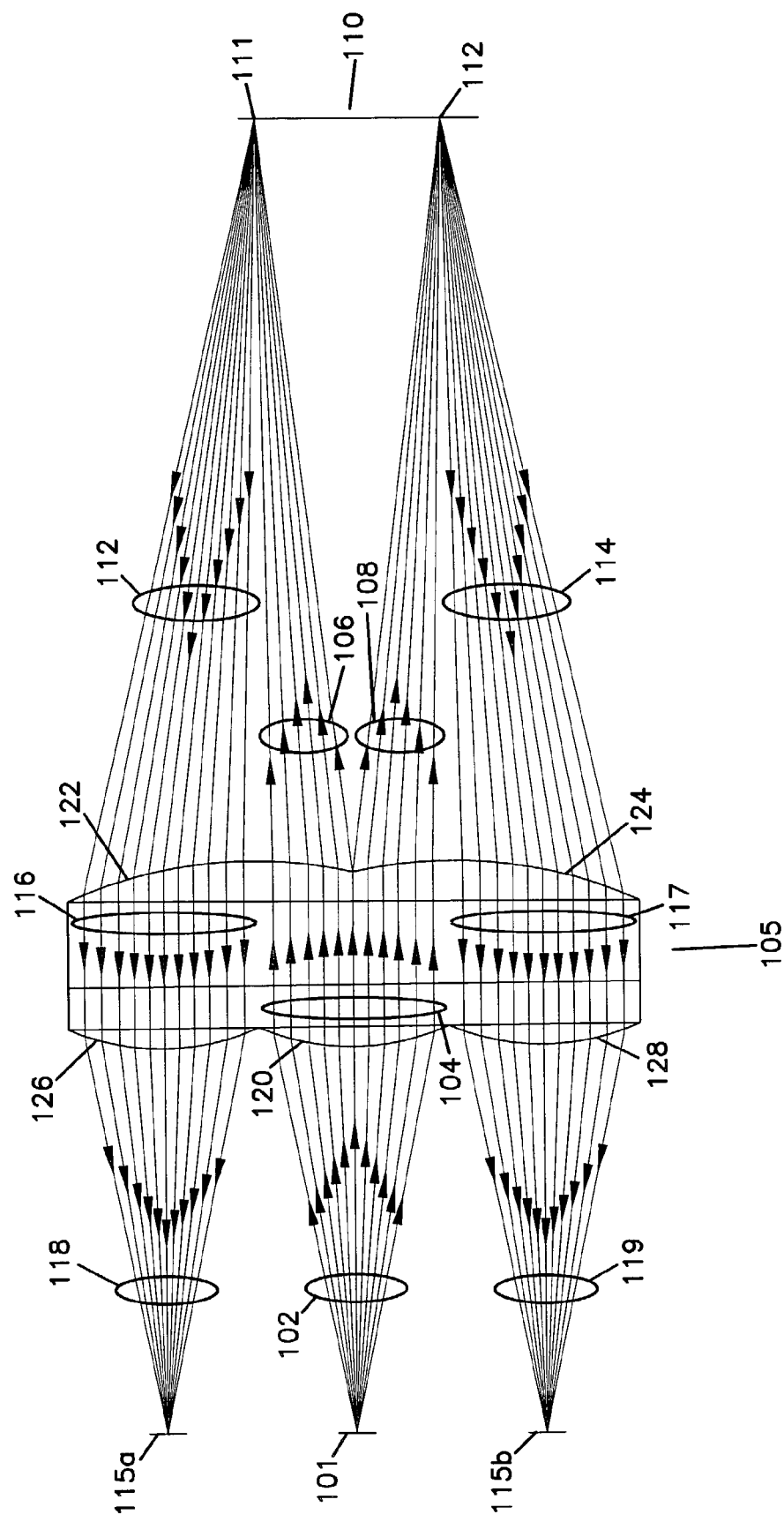
FIG. 3 represents a schematic diagram of a device in accordance with one aspect of the invention.

The focal point of the individual lens surfaces of lens system 105 also depends in part on the configuration of the device of the invention 100 and its relative proximity with the object 110. In one embodiment of the invention, depicted in FIG. 3, the focal point of fourth lens surface 126, for example, is related to the distance from fourth lens surface 126 to detector 115. In this embodiment of the invention is preferred that the focal point of fourth lens surface 126 and the distance from fourth lens surface 126 to detector 115 are equal so that the focal point of fourth lens surface 126 is located on the surface of detector 115. Examples of focal points and the related distances from lens surfaces to the detector 115 or object 110 can be seen in FIGS. 3 and 4.

Lens system 105 can comprise normal lens making materials such as glass, or plastic. Preferably, lens system 105 comprises plastic. Examples of plastics useful for manufacturing lens system 105 include but are not limited to polymethylmethacrylate, polyolefins, polystyrene, or polycarbonate.

Preferably, lens system 105 is manufactured through injection molding of plastics. One method of making lens system 105 by injection molding begins by tooling a die. The die is then filled with transparent liquid plastic. Once the die and contained plastic cools, the plastic is removed from the die to give the resulting lens system 105.

The precise nature of the individual lens surfaces that comprise lens system 105 in this embodiment of the invention can be explained through use of the "sag" equation. Solving the sag equation, gives the ultimate parameters for the individual lens surfaces of lens system 105. The information can also be used to tool a die for injection molding of lens system 105.

One form of the "sag" equation is as follows:

$$z = \frac{cr^2}{1 + \sqrt{1 - (1+k)c^2r^2}} + \text{higher order terms}$$

where z=the sag of the lens
c=curvature of the lens
r=radial coordinate of the lens
k=aspheric coefficient Generally, the higher order terms can be ignored. This allows the equation to be solved more easily while still obtaining an acceptable result.

Referring again to FIG. 3, the functioning of a device of the invention 100 is explained. Source 101 emits radiation represented by emitted radiation rays 102. Emitted radiation rays 102 travel into first collimating lens 120. First lens surface 120 causes emitted radiation rays 102 to become nearly parallel, as is represented by first collimated rays 104. First collimated rays 104 then pass out of second lens surface 122 and third lens surface 124. Second lens surface 122 and third lens surface 124 function to focus first collimated rays 104, creating top focused rays 106 and bottom focused rays 108. Top focused rays 106 and bottom focused rays 108 focus onto a top focal point 111 and a bottom focal point 112 at some point on the surface of object 110.

Object 110, being at least somewhat reflective then acts to reflect at least some portion of top focused rays 106 and bottom focused rays 108 back towards lens system 105 creating top reflected rays 112 and bottom reflected rays 114.

Top reflected rays 112 and bottom reflected rays 114 pass through second lens surface 122 and third lens surface 124 respectively. Second lens surface 122 and third lens surface 124 function as collimating lenses as top reflected rays 112 and bottom reflected rays 114 pass through the lens surfaces, creating top collimated rays 116 and bottom collimated rays 117. Top collimated rays 116 and bottom collimated rays 117 then pass through fourth lens surface 126 and fifth lens surface 128 which function as focusing lens creating top focused rays 118 and bottom focused rays 119. Top focused rays 118 and bottom focused rays 119 then impinge upon top detector 115a and bottom detector 115b.

Figure 4:
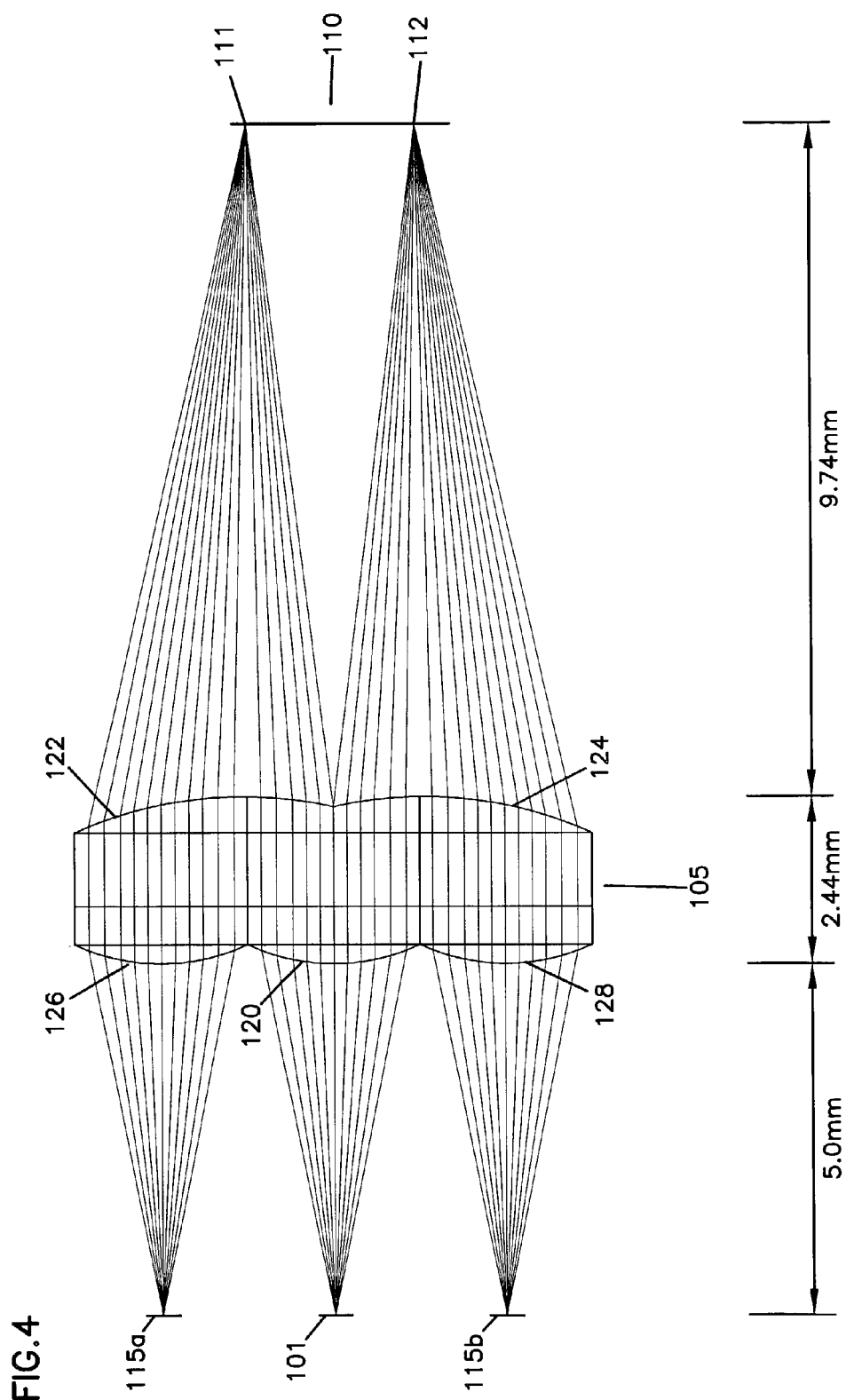
FIG. 4 represents a schematic diagram of a device in accordance with another aspect of the invention.

Another embodiment of a device of the invention is depicted in FIG. 4. Specific parameters of this embodiment of the invention may also be determined using the sag equation.

In this embodiment, first lens surface 120, fourth lens surface 126, and fifth lens surface 128 have the following attributes. The diameter Φ is equal to 3 mm, the curvature of the lenses, c is equal to approximately 0.35/mm, and the aspheric coefficient, k is equal to approximately −2.468. A radial coordinated is chosen based on the desired size of the ultimate lens, and then the equation can be solved to give the resulting sag of the lens. These parameters of the lens, including the sag are then used to construct the lens as is known to those of skill in the art, having read this specification.

The opposite surface of lens system 105, comprising second lens surface 122 and third lens surface 124 have a diameter Φ equal to 6.0 mm, a curvature of the lenses, c that is equal to approximately 0.18/mm, and an aspheric coefficient, k that is approximately −2.468. As above, once the radial coordinate is chosen, the sag can be determined and the lens can be constructed as is known to those of skill in the art, having read this specification.

The focal point of the first lens surface 120, fourth lens surface 126, and fifth lens surface 128 is equal to 5.0 mm, with the source 101, top detector 115a and bottom detector 115b being placed on a plane defined by being 5.0 mm away from the surface of the first lens surface 120, fourth lens surface 126, and fifth lens surface 128. The focal point of the second lens surface 122 and third lens surface 124 is 9.74 mm, and the device is configured in such a way that the object 110 is 9.74 mm away from the surface of the second lens surface 122 and third lens surface 124.

In the embodiment of this example, the lens system 105 has a thickness of approximately 2.44 mm at the thickest points.

In this embodiment, the source 101 is an oxide VCSEL, and the detectors 115a and 115b are photodetectors. The source 101 emits light from an aperture of 3 μm. After the radiation from source 101 is transmitted through lens system 105, two spots are produced on object 110 with a diameter of 6 μm.

Figures 5, 6:
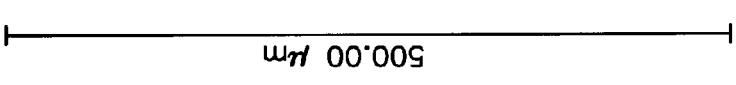
FIG. 5 represents a spot diagram of a laser beam produced by the device of the invention depicted in FIG. 4 above, on an object.
FIG. 6 represents a spot diagram of a laser beam produced by the device of the invention depicted in FIG. 4 above, on the detector of the device of the invention.

FIG. 5 represents the size of top focal points 111 and bottom focal points 112 on the object 110. The corresponding spot size on the detectors 115a and 115b created by this device is seen in FIG. 6.

Figure 7:
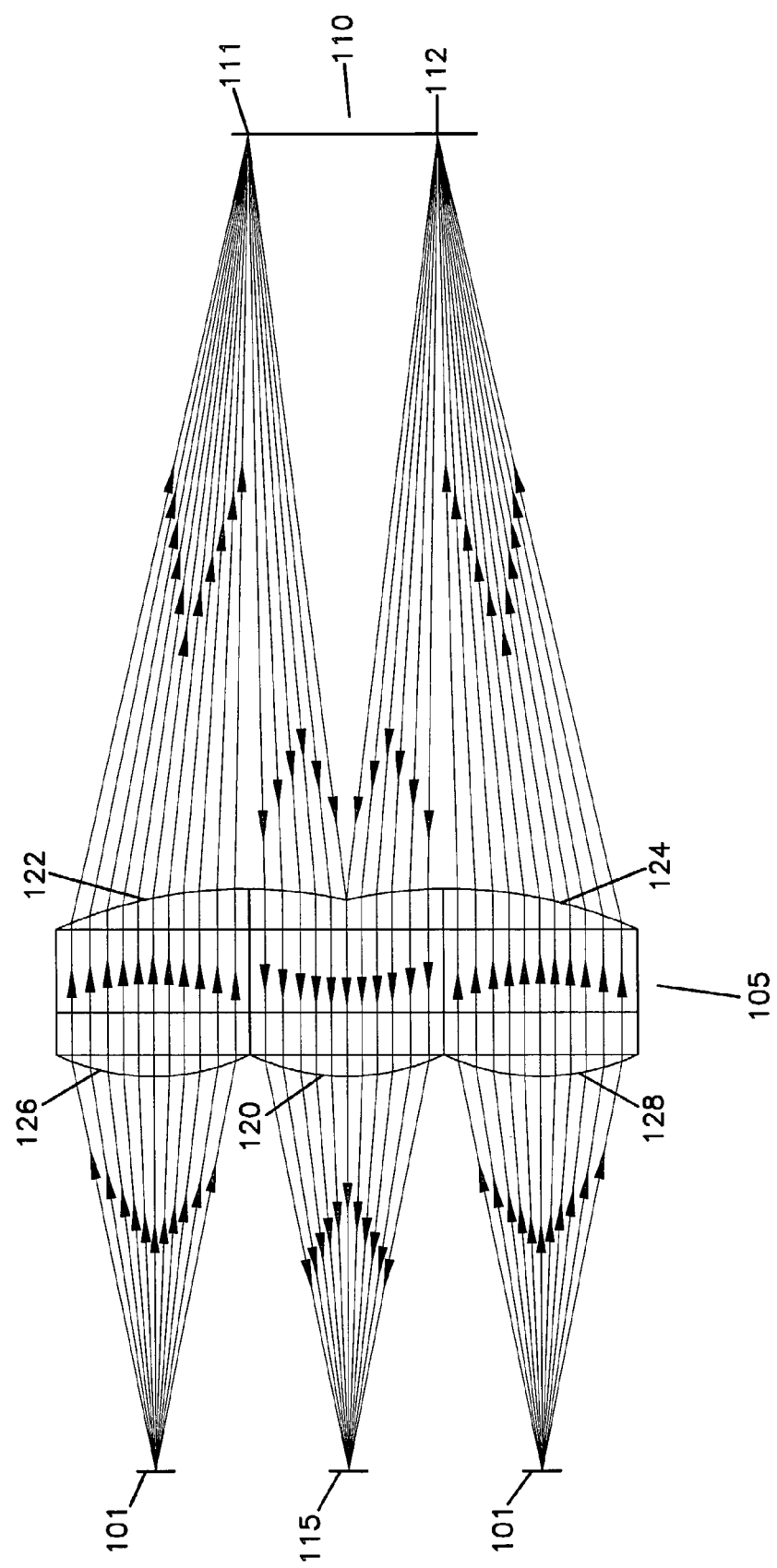
FIG. 7 represents a schematic diagram of a device in accordance with yet another aspect of the invention.

FIG. 7 depicts yet another embodiment of the invention. The lens system 105 of FIG. 7 is analogous to that of FIG. 4, and the details thereof will not be reiterated here.

The device 100 of FIG. 7 has two sources, top source 101a and bottom source 101b. This embodiment of the invention also has only one detector 115. The arrows in FIG. 7 depict the path of the radiation through the device 100 and onto object 110.

One example of a use of a device 100 as depicted in FIG. 7 is for wafer mapping. Wafer mapping describes the detection of the perimeter edge of semiconductor wafers or magnetic memory disks. It is particularly advantageous when such wafers or disks are spaced in close proximity to one another. This situation occurs both in processing applications and transport. Wafers or disks are generally racked or mounted vertically on their edges and stacked horizontally in plastic carriers. Detecting the edge of a wafer or disk allows accurate information regarding the positioning. Such accurate information is imperative when directing automated processing or transport equipment.

Devices of the invention, such as that in FIG. 4 or 7 can also be utilized to determine the velocity of a moving object. A device of the invention, as depicted in FIG. 4 or 7 and described above is directed toward a moving target. As the radiation of the device impinges upon the target, the detector will not get a signal until the target is in front of the focal points of the device. The first beam of radiation will impinge upon the leading edge of the target at time $t_1$. As the target moves through the beam, the first beam of radiation will also impinge upon the trailing edge of the target, this occurs at time $t_2$. The detector collects the radiation impinging thereupon at both time $t_1$ and $t_2$, thereby recording these two times.

The second beam of radiation will encounter the target in exactly the same manner, the leading edge hitting the target at $t'_1$ and the trailing edge hitting the target at $t'_2$. The distance between the focal points on the target, D, can be determined by the configuration of the device 100. The velocity of the target can then be determined using the equation given below:

$$\text{velocity} = \frac{D}{\Delta T} = \frac{D}{t'_1 - t_1}$$

Once the velocity has been determined as above, the length of the target can also be determined using the equation below.

$$\text{length of target} = t_2 - t_1 \times \text{Velocity}$$

The embodiments and examples set forth herein are presented to best explain the invention and its practical application and to thereby enable those skilled in the art to make and utilize the invention. Those skilled in the art, however, will recognize that the foregoing description and examples have been presented for the purpose of illustration and example only. Other variations and modifications of the invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the invention can involve components having different characteristics. It is intended that the scope of the invention be defined by the claims appended hereto, giving full cognizance to equivalents in all respects.

The embodiments of an invention in which an exclusive property or right is claimed are defined as follows:

1. A sensor comprising:
   at least one source that produces radiation;
   at least one detector; and
   at least one lens system including a lens body having at least a first lens surface and at least a second, opposing, lens surface, wherein said first lens surface collimates and said second lens surface focuses said radiation onto at least two different regions of a surface of a reflective object, wherein said reflective object reflects at least some of said radiation, and said second lens surface collimates and said first lens surface focuses said reflected radiation onto said at least one detector, thereby sensing said reflective object.

2. The sensor of claim 1, wherein said source is a vertical cavity surface emitting laser, an edge emitting laser, or a light emitting diode.

3. The sensor of claim 2, wherein said source is a vertical cavity surface emitting laser.

4. The sensor of claim 3, wherein said vertical cavity surface emitting laser has a threshold current of less than about 1 mAmp.

5. The sensor of claim 1, further comprising at least two sources.

6. The sensor of claim 5, wherein said at least two sources are vertical cavity surface emitting lasers.

7. The sensor of claim 6, wherein said vertical cavity surface emitting lasers have threshold currents of less than about 1 mAmp.

8. The sensor of claim 1, wherein said detector is a photodetector, a p-n junction detector, or a phototransistor.

9. The sensor of claim 7, wherein said detector is a photodetector.

10. The sensor of claim 1, further comprising at least two detectors.

11. The sensor of claim 1, wherein said lens system comprises an aspherical lens.

12. The sensor of claim 1, wherein said lens system comprises plastic.

13. The sensor of claim 11, wherein said lens system comprises, polymethylmethacrylate, polyolefins, polystyrene, or polycarbonate.

14. The sensor of claim 1, wherein said lens system is symmetrical across a horizontal axis.

15. The sensor of claim 1, wherein said lens body comprises a sensor surface and an object surface.

16. The sensor of claim 15, wherein said sensor surface comprises three individual surfaces, and said object surface comprises two individual surfaces.

17. The sensor of claim 16, wherein said three individual surfaces that comprise said sensor surface are virtually the same, and said two individual surfaces that comprises said object surface are virtually the same.

18. the sensor of claim 1, wherein the at least one lens system includes:
a lens body having a first major surface and an opposing second major surface;
the first major surface including three individual lens surfaces that are virtually the same situated in a side by side relation, the three individual lens surfaces including a left lens surface, a middle lens surface and a right lens surface; and
the second surface including two individual lens surfaces that are virtually the same situated in a side by side relation, the two individual lens surfaces meeting in a region that corresponds to a center or substantially a center of the middle lens surface in at least one dimension of the first major surface.

19. A sensor comprising:
at least one source that produces radiation;
at least one detector;
at least one lens system, wherein said lens system includes a lens body having a sensor facing surface, wherein said sensor facing surface comprises three individual curved lens surfaces that are virtually the same; and an object facing surface wherein said object facing surface comprises two individual curved lens surfaces that are virtually the same; wherein one of said sensor facing surface and said object facing surface collimates said radiation from said source, and the other surface focuses said radiation onto at least two spots, wherein outgoing radiation from said at least one source interacts with each of the two individual curved lens surfaces of the object facing surface.

20. The sensor of claim 19, wherein said source is a vertical cavity surface emitting laser.

21. The sensor of claim 20, wherein said vertical cavity surface emitting laser has a threshold current of less than about 1 mAmp.

22. The sensor of claim 19, further comprising at least two sources.

23. The sensor of claim 22, wherein said at least two sources are vertical cavity surface emitting lasers.

24. The sensor of claim 23, wherein said vertical cavity surface emitting lasers have threshold currents of less than about 1 mAmp.

25. The sensor of claim 19, wherein said detector is a photodetector, a p-n junction detector, or a phototransistor.

26. The sensor of claim 25, wherein said detector is a photodetector.

27. The sensor of claim 19, further comprising at least two detectors.

28. The sensor of claim 19, wherein said lens system comprises an aspherical lens.

29. The sensor of claim 19, wherein said lens system comprises plastic.

30. The sensor of claim 29, wherein said lens system comprises, polymethylmethacrylate, polyolefins, polystyrene, or polycarbonate.

31. The sensor of claim 19, wherein said lens system is symmetrical across a horizontal axis.

32. The sensor of claim 19 wherein the two individual curved lens surfaces of the object facing surface are laterally offset relative to the three individual curved lens surfaces of the sensor facing surface.

33. The sensor of claim 19 wherein each of the two individual curved lens surfaces of the object facing surface are larger than each of the three individual curved lens surfaces of the sensor facing surface.

34. A method of detecting the presence of a reflective object comprising the steps of:
emitting radiation from at least one source;
collimating and focusing said radiation onto at least two regions of a surface of a reflective object to be sensed, wherein said reflective object reflects at least some of the radiation incident thereon;
collimating and focusing said reflected radiation onto at least one detector; and
detecting the presence of said reflective object by detecting said focused radiation, wherein detection of said radiation by said detector indicates the presence of said object.

35. A method of determining the velocity of an object that includes the steps of:
sensing at least one edge of an object with a sensor comprising:
at least one source that produces radiation;
at least one detector; and
at least one lens system, wherein said lens system collimates and focuses said radiation into at least two different beams that impinge upon the surface of a reflective object, wherein said reflective object reflects at least some of said radiation, and said lens system collimates and focuses said reflected radiation onto said at least one detector, thereby sensing said reflective object;

calculating the velocity of said object by determining the distance between said two different beams impinging upon said surface of said object; and dividing said distance by the difference in the time it takes said two beams to detect at least one edge of said object to determine the velocity of said object.

36. The method of claim 35, wherein said edge detected is said leading edge of said object.

37. The method of claim 36, further comprising detecting said trailing edge.

38. The method of claim 37, wherein said velocity of said object is determined by considering the velocity determined by the leading edge detection and the trailing edge detection.

39. A sensor comprising:
  at least one laser;
  at least one detector;
  at least one lens system, wherein said lens system includes a lens body having an object facing surface and a sensor facing surface, wherein said sensor facing surface comprises at least two individual surfaces; wherein a first one of said individual surfaces of said sensor facing surface is adapted to collimate radiation from said laser, and the object facing surface is adapted to focus said radiation onto a reflective object, wherein said reflective object reflects at least some of said radiation, and wherein reflected radiation from said reflective object interacts with a second one of said individual surfaces of said sensor facing surface and is focused on said at least one detector.

40. The sensor of claim 39 wherein the object facing surface includes at least two individual surfaces, and wherein the at least two individual surfaces of the sensor facing surface are offset relative to the at least two individual surfaces of the object facing surface.

41. The sensor of claim 40 wherein each of the at least two individual surfaces of the sensor facing surface are smaller than each of the at least two individual surfaces of the object facing surface.

42. A sensor comprising:
  a source that produces a radiation beam;
  at least one detector; and
  at least one lens , wherein said at least one lens collimates and focuses said radiation beam onto at least two different regions of a surface of a reflective object, wherein said reflective object reflects at least some of said radiation, and said at least one lens collimates and focuses said reflected radiation onto said at least one detector, thereby sensing said reflective object.

* * * * *